Sept. 28, 1926.
G. R. FULLER
OIL SPLASH PAN
Filed Sept. 7, 1922
1,601,115
2 Sheets-Sheet 1
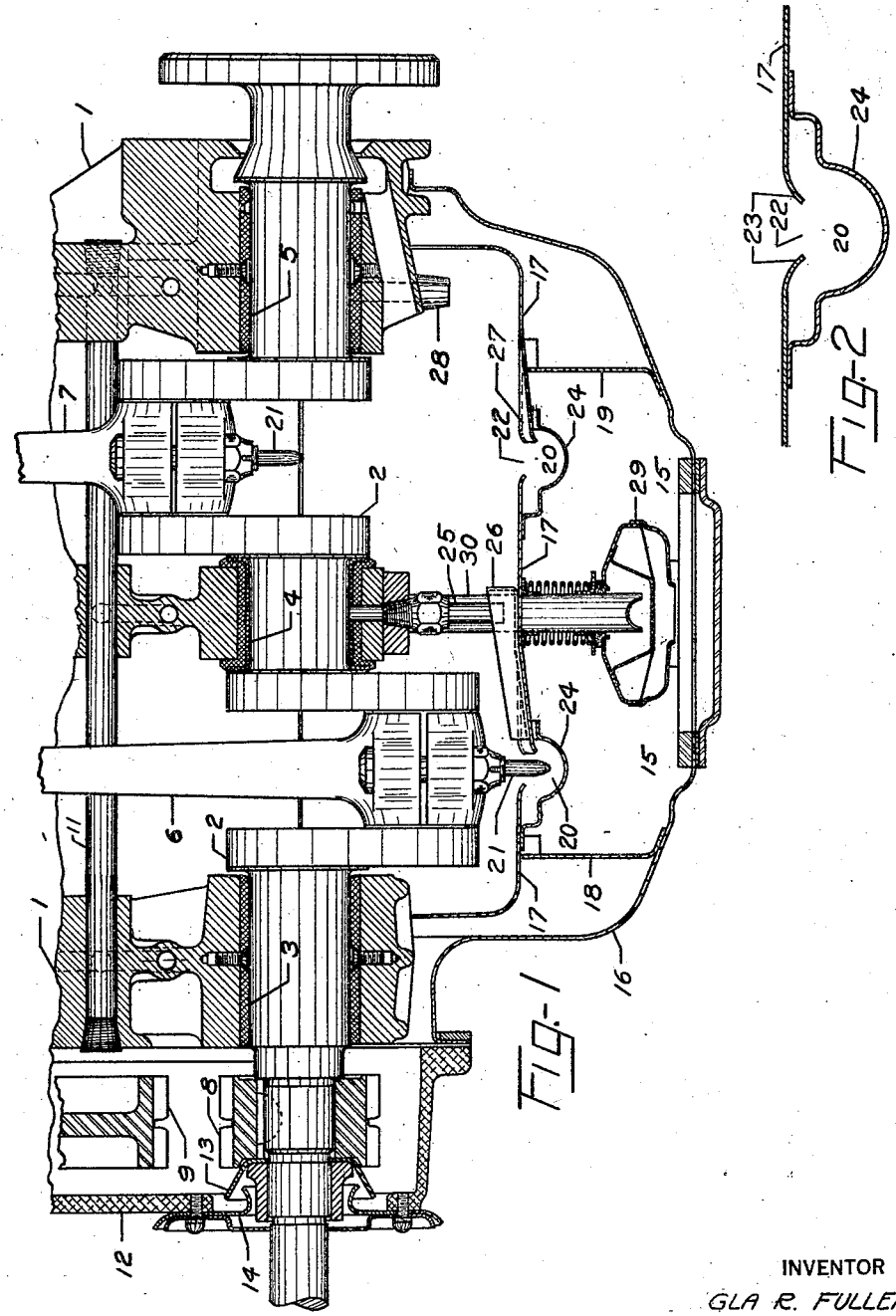
INVENTOR
GLA R. FULLER
BY
William MacGlashan
ATTORNEY

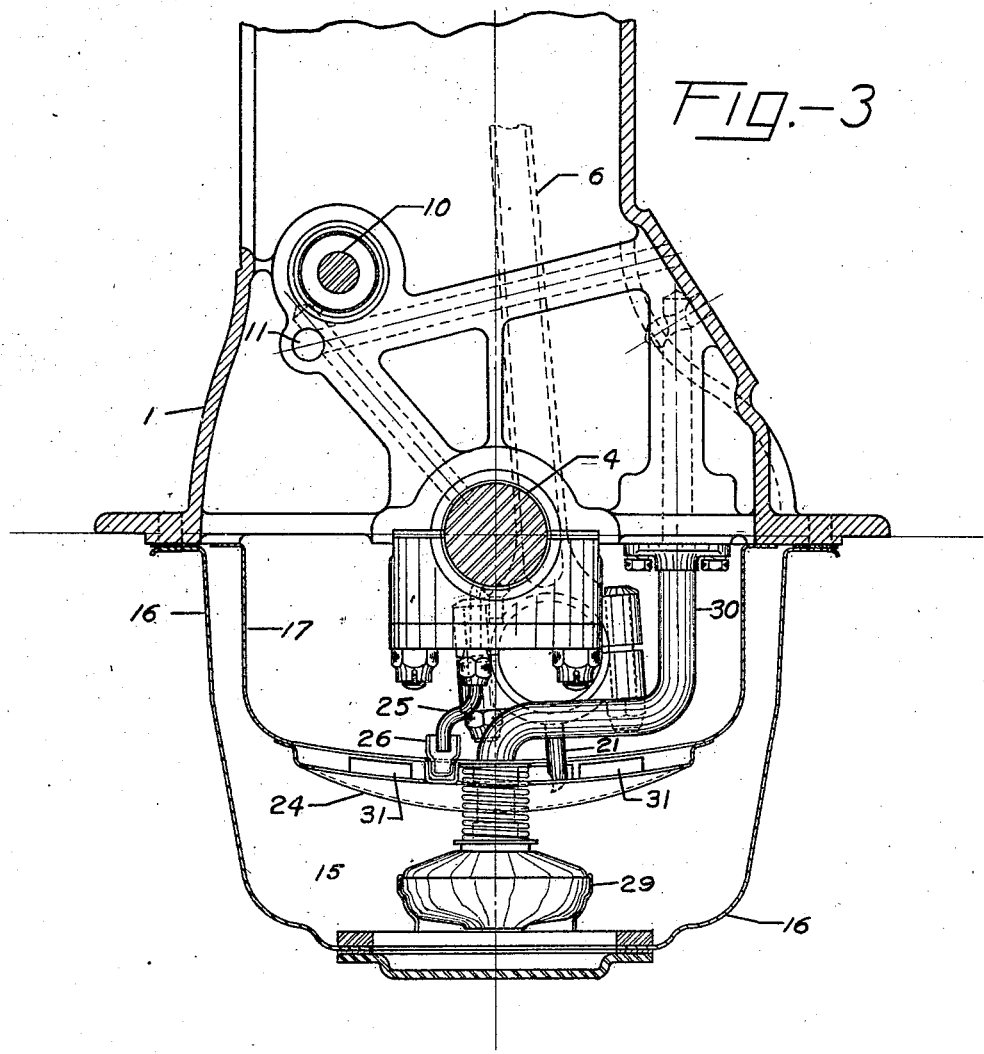

Patented Sept. 28, 1926.

1,601,115

UNITED STATES PATENT OFFICE.

GLA RUSSEL FULLER, OF DETROIT, MICHIGAN, ASSIGNOR TO STUDEBAKER CORPORATION, A CORPORATION OF NEW JERSEY.

OIL SPLASH PAN.

Application filed September 7, 1922. Serial No. 586,695.

This invention relates to improvements in oil splash pans for engines and has for its object to provide such a splash pan that will prevent excessive splashing of lubricating oil upon the cylinder walls and crankshaft cheeks and will have a relatively low cost of production.

These being among the objects of the present invention, the same consisting of certain features of construction and combination of parts to be hereinafter described and claimed with reference to the accompanying drawings, which illustrate a suitable embodiment of my invention, having the above and other objects in view.

Figure 1 is a fragmentary longitudinal sectional view of an internal combustion engine containing an oil splash pan embodying my present invention.

Figure 2 is a fragmentary sectional view taken transversely thru an oil trough and immediate co-operating members, other than at the point where the oil is led into the trough.

Figure 3 is a fragmentary transverse sectional view of the engine of Fig. 1 containing an oil splash pan embodying my present invention.

1 is the lower part of an engine cylinder block, 2 is a crank shaft, 3, 4 and 5 are main crank shaft bearings, 6 and 7 are connecting rods, 8 and 9 are gears for driving a cam shaft 10, 11 is a pipe for distributing oil to the main bearings 3, 4 and 5, 12 is a cover for the gears 8 and 9, 13 is a ring for throwing oil off the end of the crank shaft 2 and 14 is a gutter for leading this oil back into the oil sump 15 situated in the lower half 16 of the crank case. In the lower half 16 of the crank case and raised from the bottom thereof so as to form an oil sump 15 beneath it is an oil splash pan 17 which is the subject of the present invention and which is spaced from the crank case 16 by the legs 18 and 19. As is common to this type of lubrication the oil splash pan has troughs 20 running transversely thereof which are provided for holding lubricating oil. As the crank shaft 2 rotates the oil dips 21 on the connecting rods 6 and 7 pass thru the oil in the troughs 20 forcing the oil thru the hollow dips and onto the connecting rod bearing for lubricating and cooling the same, and in passing thru the oil in the troughs 20, also splash oil up into the crank case, thereby lubricating the cylinder walls. Heretofore the construction of the oil splash pans have been such that a very large amount of oil, often amounting to an excess, has been splashed out of the troughs by the connecting rod dips. The usual result of this excess amount of oil is that when the pistons and piston rings become worn "oil pumping" or passing of oil into the combustion chamber invariably results with the corresponding disadvantages of fouled spark plugs and missing engine. My invention has for one of its objects the prevention of this excess splashing. I do this by cutting a slot 22 in the oil pan, of slightly greater width than the connecting rod oil dip 21 and turning the edges of the slot downwardly as shown at 23 in Fig. 2. Below this slot I provide a trough 24 made of a separate piece of material and fastened to the body of the oil pan 17 in any convenient manner such as riveting, brazing, spot-welding etc. This trough member 24 has an arcuate portion for holding the oil and an outwardly projecting portion which fastens to the body portion 17. The outwardly extending portion is slotted on the sides as at 31 to allow the oil to pass therethru, the top of the arcuate portion constituting the high level of oil in the trough. When the connecting rod dip passes thru the trough 20 it splashes oil in all directions. This construction is such to allow only an amount of oil limited by the width of the slot 22 to pass up into the crank case. The oil splashed other than thru the slot 22 is either deflected back into the trough 20 or thru the slots 31 in the trough sides into the sump 15 preventing an excess of oil from being thrown up onto the cylinder walls and crankshaft cheeks. The downwardly turned edges 23 of the body portion 17 help to drain the oil splashed onto the upper surface of body portion 17 back into the trough 20.

The method of filling the troughs 20 with oil in the present case is to provide means for leading the surplus oil from the main bearings into the troughs. In one case a pipe 25 carries the oil from the bearing 4 to a shoe shaped trough 26 which leads into the trough 20 thru a depression 27 in the side of the main body portion 17. A portion of the side of the trough member 24 opposite the point where the oil from the shoe shaped trough member 26 enters the trough 20 is not slotted as in the rest of the member 24, thus providing a baffle for the oil pouring out of the shoe shaped trough 26 and deflecting it into the trough 20. At 28 a drilled boss leads the oil from the bearing 5 to the body of the oil pan 17 where it follows the depression 27 into the trough 20.

The oil splashed out of the trough 20 drains back into the trough or into the oil sump 15 from which it passes thru the removable strainer 29 thru the pipe 30 to the oil pump and thence again to the different bearings.

Formal changes may be made in the specific embodiment of the invention described without departing from the spirit or substance of the broad invention, the scope of which is commensurate with the appended claims.

What I claim is:—

1. In a lubricating system for engines, a crank case, a splash pan contained therein, members to support and space said splash pan from said crank case, trough members comprising arcuate portions, substantially horizontal walls, vertical walls and outwardly extending flanges, said flanges on said trough members secured to said splash pan on the under side thereof, slots in said splash pan communicating with said trough members, and depressions in said splash pan for carrying lubricant to said slots and into said trough members.

2. In a lubricating system for engines, a crank case, a splash pan, means to support and space said splash pan within said crank case and apart therefrom, transverse slots in said splash pan, depressions in said splash pan for carrying lubricant to said slots, trough members of greater width than said slots secured to said splash pan beneath said slots, and openings in said trough members to limit the level of lubricant therein and to provide an overflow into said crank case.

3. In a lubricating system for engines, a crank shaft, piston connecting rods connected thereto, oil dips on said connecting rods, a crank case cover to house said connecting rods and provide an oil reservoir, an oil splash pan within said cover and spaced apart therefrom, slots in said splash pan to receive the oil dips on said connecting rods, trough members to receive oil secured to said splash pan beneath said oil dips and extending beyond the edges of said slots whereby the edges thereof form eaves for said trough members whereby oil can be collected by said dips, and openings in said trough members to limit the level of lubricant therein and to provide an overflow into said crank case cover.

4. In a lubricating system for engines, an oil splash pan having separate trough members and a main body portion provided with transverse slots having downwardly turned edges, said trough members extending beyond the edges of said slots whereby the edges of said slots form eaves over said troughs, the upper portion of said trough members having openings therein for controlling the level of lubricant and permitting the escape of lubricant not splashed through said slots by connecting rod oil dips, and means having communication with a crank shaft bearing for directing lubricant into one of said troughs.

5. In a lubricating system for engines, a splash pan having slots formed therein; trough members having arcuate portions, substantially horizontal walls, vertical walls, and outwardly extending flanges, said flanges being secured to said splash pan at opposite sides of said slot and at a spaced distance therefrom; openings in said vertical walls of said trough members for limiting the level of the lubricant therein, and depressions in said splash pan for carrying lubricant to said slots and into said troughs.

6. In a lubricating system for engines having a crank shaft supported in bearings and a crank case enclosing the same, a splash pan having openings therein and depressions leading to said openings, means communicating with at least one of said bearings to permit the escape of lubricant therefrom and a trough directing the lubricant from said means to one of said openings.

7. In a lubricating system for engines having a crank shaft supported in bearings and a crank case enclosing the same, a splash pan having openings therein and depressions leading to said openings, a tube connected at one end to one of said bearings, and a trough positioned to receive the opposite end of said tube and direct lubricant from said bearing to an opening in said splash pan.

Signed by me at Detroit, Michigan, U. S. A., this 5th day of September, 1922.

GLA RUSSEL FULLER.